(12) United States Patent
Gottemoller

(10) Patent No.: US 8,012,525 B2
(45) Date of Patent: Sep. 6, 2011

(54) WHOLE SOYBEAN POWDERS

(75) Inventor: Thomas Gottemoller, Mt. Zion, IL (US)

(73) Assignee: Archer Daniels Midland Company, Decatur, IL (US)

( * ) Notice: Subject to any disclaimer, the term of this patent is extended or adjusted under 35 U.S.C. 154(b) by 860 days.

(21) Appl. No.: 11/931,276

(22) Filed: Oct. 31, 2007

(65) Prior Publication Data

US 2008/0102167 A1      May 1, 2008

Related U.S. Application Data

(63) Continuation-in-part of application No. 10/810,857, filed on Mar. 26, 2004, now abandoned.

(60) Provisional application No. 60/458,943, filed on Apr. 1, 2003, provisional application No. 60/519,795, filed on Nov. 14, 2003.

(51) Int. Cl.
*A23L 1/20* (2006.01)

(52) U.S. Cl. .......... 426/634; 426/72; 426/598; 426/615; 426/631; 426/650

(58) Field of Classification Search ............... 426/72, 426/598, 615, 631, 634, 650
See application file for complete search history.

(56) References Cited

U.S. PATENT DOCUMENTS

| | | | | |
|---|---|---|---|---|
| 3,469,994 A | * | 9/1969 | Williams | 426/289 |
| 4,039,696 A | * | 8/1977 | Marquardt et al. | 426/598 |
| 4,088,795 A | * | 5/1978 | Goodnight et al. | 426/598 |
| 4,748,038 A | * | 5/1988 | Lewis et al. | 426/456 |
| 4,902,526 A | * | 2/1990 | Sudo et al. | 426/598 |
| 6,244,528 B1 | * | 6/2001 | Wallis et al. | 241/8 |

OTHER PUBLICATIONS

Archer Daniels Midland Co., Organic Whole Soybean Powder, Midland Harvest, 2006, 2 pgs. USA.
Archer Daniels Midland Co., Nutrisoy Organic Whole Soybean Powder, Nov. 17, 2004, 2 pgs., USA.

* cited by examiner

*Primary Examiner* — Anthony Weier

(57) ABSTRACT

Compositions having whole soybean powders and soymilks produced therefrom are described.

6 Claims, 1 Drawing Sheet

WHOLE SOYBEAN POWDERS

CROSS REFERENCE TO RELATED APPLICATIONS

This application is a continuation-in-part of, prior U.S. patent application Ser. No. 10/810,857, filed Mar. 26, 2004, now abandoned which itself claims priority to U.S. Provisional Patent Application No. 60/458,943, filed Apr. 1, 2003, and to U.S. Provisional Patent Application No. 60/519,795, filed Nov. 14, 2003, each of the contents of which are incorporated herein by this reference.

TECHNICAL FIELD

The present invention is related to the field of processing techniques used in the manufacture of soyfoods. The invention provides methods for preparing a soya fiber particulate from dehulled soybeans. The invention can be used to obtain a soya fiber particulate having a particle size in a range of about 0.01 microns to about 100 microns, wherein at least about 50% to about 100% of the soya fiber particulate has a size in a range of about 0.01 microns to about 35 microns. The soya fiber particulate may be used alone or as an ingredient in food products.

BACKGROUND

The soybean is the one of the few plant protein sources that provides all eight essential amino acids. Soy protein is of the highest quality, equal to that of meat and dairy products, but without the cholesterol and high levels of saturated fat. In addition, the soybean has a higher amount of protein than other beans. Research has revealed many possible health benefits that may be achieved from the consumption of food products containing soy protein. The bioactive molecules occurring naturally in soy protein have antioxidant activities, which enhance the immune system, the body's defense against a wide range of diseases. For example, soy protein may play a role in the reduction of the risk of developing cardiovascular disease, including preventing heart attack, stroke, and high blood pressure. Soy protein, which is contained within soya fiber particulates, may also play a role in the reduction of the risk of developing kidney disease, various cancers and diabetes. Soy protein may also help protect against the development of osteoporosis and promote weight management. Because of these and other potential health effects, the commercial demand for soya fiber particulates is expected to rise rapidly.

Soymilk, an aqueous extraction of soybeans, is used as a base in a wide variety of products. There are already a few reported processing techniques used in the manufacture of soymilk. A traditional method for soymilk production involves cleaning and then soaking whole, undehulled soybeans in cold water, rinsing the soaked soybeans, grinding the rinsed soybeans with additional fresh water into a coarse slurry, heating and then centrifuging the slurry, retaining the soluble soymilk fraction and disposing of the okara residue, also described as soymilk pulp or cell wall debris.

One disadvantage of traditional methods for soymilk production is the presence of an undesirable beany flavor, odor, and color. In order to improve the flavor of soymilk, alternate methods include heating and/or blanching for the inactivation of the enzymes that are responsible for the undesirable beany flavor and subsequent extraction of soluble constituents. For example, U.S. Pat. No. 4,039,696 describes a process for preparing a milk-like product from whole soybeans by hot aqueous alkaline blanching and centrifugation. U.S. Pat. No. 4,971,825 describes a process for producing soybean milk which involves crushing, rather than grinding, soybeans in aqueous hot medium followed by soy protein extraction. U.S. Pat. No. 4,992,294 discloses a method of producing soybean milk by boiling soybeans and straining the boiled solution. U.S. Pat. No. 5,945,151 describes a process for producing a soymilk which involves heating a soybean paste. U.S. Pat. No. 4,186,218 describes a process of improving denatured soy protein by superheating and/or alcohol extraction.

Other methods for eliminating undesirable odors from soymilk include fermentation. U.S. Pat. No. 3,971,843 describes a process for eliminating a bean odor from a soymilk by fermentation and distillation under reduced pressure. U.S. Pat. No. 4,664,919 describes a process for producing a liquid-like lactic acid soymilk drinks by inoculating filtered pulverized soybeans with Streptococcus sojalactis bacterium.

Soymilk produced according to traditional methods has a grainy texture. Occasionally, this grainy texture is desirable. For example, U.S. Pat. No. 6,413,557 describes a process for preparing a textured soya beverage which includes blending soaked, rinsed, and cooked soybeans with loose soybean hulls. However, a soymilk composition with a smooth texture and pleasant mouthfeel is usually preferable. In order to obtain a soymilk with a smooth texture, alternate methods include the addition of enzymes to soybeans to degrade proteinaceous, carbohydrate, and cellulosic constituents, preventing sedimentation. For example, U.S. Pat. No. 3,941,890 describes a process for preparing soymilk from dehulled soybeans by microwaving and adding suitable enzymatic material. U.S. Pat. No. 4,378,376 describes a process for producing a simulated milk protein product by forming a neutralized aqueous slurry of a soya protein material and dairy whey and then reacting the slurry with a proteolytic enzyme. Other methods for obtaining a soymilk with a smooth texture include multiple or extensive grinding steps. For example, U.S. Pat. No. 5,807,602 describes a process for making a finely divided soya product based on continuous milling, superheating and flash evaporation. This method obtains soya particles wherein 90% have a diameter of less than 85 microns and 50% have a diameter of less than 40 microns. U.S. Pat. No. 4,194,018 describes a process of preparing a soya composition from soybeans yielding particulate in which the largest dimension does not exceed 40 to 300 microns.

Finally, another disadvantage of traditional methods for soymilk production is that the full nutritional quality of the soybean is not maximized. In order to improve the nutritional quality of soymilk, alternate methods include the use of acid or acid salt to process soybeans; specifically to chelate various soybean components. For example, U.S. Pat. No. 6,322,846 describes a process for preparing soymilk and beverage compositions from whole soybeans which involves the addition of at least one of an acid and/or an acid salt. U.S. Pat. No. 4,389,425 describes a process for preparing a bovine milk substitute which includes grinding soybeans in the presence of an acidified water solution followed by homogenization, desludging, and extraction.

Other methods for improving the nutritional quality of soymilk involve extraction and/or filtration. For example, U.S. Pat. No. 3,995,071 describes a process based on the aqueous extraction of defatted soy flakes, basefication, and the removal of insolubles. U.S. Pat. No. 4,091,120 describes a process for preparing soya protein beverages by ultrafiltration purification and precipitation.

However, all of these reported processes are unable to produce a soya fiber particulate that has, simultaneously, a very smooth texture, a high nutritional value and lacks a beany flavor. For example, while the process disclosed in U.S. Pat. No. 4,194,018 produces a soya composition of a somewhat improved texture, the largest dimension of the product does not exceed 50 to 300 microns, meaning that the composition still has a grainy mouthfeel and lacks the stability for the prevention of sedimentation of the soy fiber particulate during storage. Therefore, there is a great need for improved, economical processes that provide very smooth soya fiber particulates.

SUMMARY OF THE INVENTION

In one embodiment, a composition comprises particles of dehulled whole soybeans, including okara and cell wall debris. At least 50% of the particles have a size of between 0.01-35 microns. The composition is 40-45% protein, 19-24% fat, and 16-19% total dietary fiber. When the composition is subjected to wet grinding and the particles of the dehulled whole soybean are examined under a light microscope, the particles have voids.

In another embodiment, a composition consists essentially of particles of dehulled whole soybeans, including okara and cell wall debris. At least 90% of the particles have a size of less than 45 microns. The composition is 40-45% protein, 19-24% fat, and 16-19% total dietary fiber and upon production of a soymilk with the composition and evaluation of the soymilk by flavor panel analysis, the soymilk has a better flavor as compared to a soymilk produced with a dry ground soybean powder.

In yet a further embodiment, a product is produced by a process comprising cracking whole soybeans, thus producing bean cracks. The process further includes placing the bean cracks in water, thus producing a slurry of wet bean cracks and subjecting the wet bean cracks to wet grinding, thus producing a wet milled product. The wet milled product is heated, homogenized, and dried, thus producing particles of the whole soybeans.

In an additional embodiment, a soymilk comprises 5-10% solids comprising particles of wet ground, dehulled whole soybeans, including okara and cell wall debris. At least 90% of the particles have a size of less than 45 microns, and the particles are 40-45% protein, 19-24% fat, and 16-19% total dietary fiber. The soymilk further includes a compound selected from the group consisting of a sweetener, a color, a flavor, a fruit, a cocoa product, a vitamin, a stabilizer, an emulsifier and combinations thereof. Upon evaluation of the soymilk by flavor panel analysis, the soymilk has a better flavor as compared to a soymilk produced with a dry ground soybean powder.

DETAILED DESCRIPTION OF THE INVENTION

Figure 1:
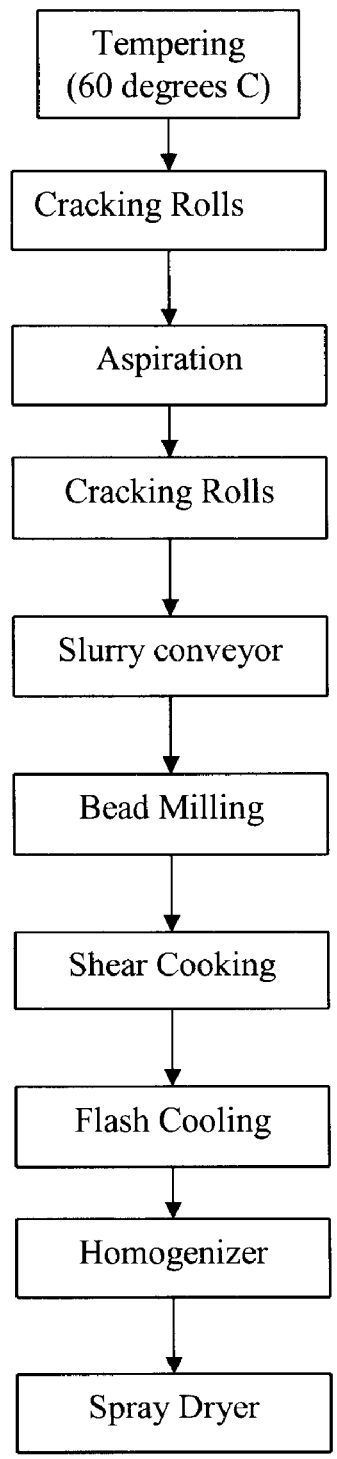
FIG. 1 is a flowchart of one embodiment of a process for producing whole soybean powders of the present invention.

The invention is based on the surprising fact that soybeans can be processed such that a soya fiber particulate having a particulate size in a range of about 0.01 microns to about 100 microns is obtained. The soya fiber particulate of the invention has a very smooth texture, because about 50% to about 100% of the soya fiber particulate has a particle size in a range of about 0.01 microns to about 35 microns. The invention utilizes, rather than disposes of, the okara, which contains high levels of fiber and also comprises iron, calcium, protein, carbohydrate, thiamin, riboflavin, and niacin. Therefore, in addition to its smooth texture, the soya fiber particulate of the present invention is of high nutritional quality. This utilization of the okara by the processes of the present invention is highly economical, due to the high disposal costs of okara incurred by other processes. Finally, the soya fiber particulate of the present invention lacks a beany flavor and has a high stability. The technology allows for the use of this soya fiber particulate alone or as an ingredient in food products.

Each of the foregoing definitions is illustrative, and is not intended to be limiting.

Beverage: As used herein, the term "beverage" includes, without limitation, for example, energy drink, sports drink, coffee, beverage powder, liquid soymilk, powdered soymilk, soymilk and milk replacer.

Cotyledon: As used herein, the term "cotyledon" includes the usable meat of the soybean. The complex carbohydrate component of the soybean is contained in the cell walls of the cotyledon.

Dehulled: As used herein, the term "dehulled" includes the hulls of the soybeans, which are the outer layer of cells which coat the cotyledons, have been removed. The hulls, which are highly cellulosic and make up about 8% of the bean's total weight, may be removed from soybeans by mechanical means, for example, by cracking or crushing. The hulls, which have been removed from dry cracked soybeans, may be separated from cotyledons by blowing. Alternatively, hulls may be removed from cracked soybeans by exposure to heat, for example, to boiling water. The hulls, which have been removed from boiled soybeans, may be washed away from the cotyledons by a stream of water and/or action of a stationary or a moving object, for example, a brush.

Dehydrated: As used herein, the term "dehydrated" includes to remove water from or to make anhydrous.

Dessert: As used herein, the term "dessert" includes, but is not limited to, for example, cakes, sponge cakes, wafers, confections, pudding, cookies, sweet pastries, fillings, muffins, biscuits and frozen desserts.

Dry mix: As used herein, the term "dry mix" includes, without limitation, for example, flakes, breakfast cereal, soup mix, falafel mix, pancake mix and cake mix.

Flour product: As used herein, the term "flour product" includes, but is not limited to, for example, soy flour, breads, for example, white bread and multigrain brain, buns, rolls, waffles, pancakes and pasta products.

Grind: As used herein, the term "grind" includes, without limitation, for example, chop, crumble, crush, disintegrate, granulate, grate, mill, pestle, pound, powder and pulverize.

Infant food: As used herein, the term "infant food" includes, but is not limited to, for example, infant formula.

Meat food product: As used herein, the term "meat food product" includes, without limitation, for example, bologna, frankfurters, burgers, sausage, luncheon, loaves, bacon, and meatballs. A meat food product may be combined with a simulated meat food product.

Milk product: As used herein, the term "milk product" includes, but is not limited to, for example, a soymilk product, sour cream, ice cream, whipped cream, yoghurt, cheese, coffee whitener, coffee creamer and cream cheese. A milk product may be combined with a simulated milk product.

Simulated meat food product: As used herein, the term "simulated meat food product" includes, without limitation, for example, a meat alternative, meat analog, soy burger, soy bologna, soy frankfurter, soy sausage, soy luncheon loaves, soy bacon and soy meatball. A simulated meat food product may be combined with a meat food product.

Simulated milk product: As used herein, the term "simulated milk product" includes, but is not limited to, for example, a milk alternative, milk analog, soymilk product, soy sour cream, soy ice cream, soy whipped cream, soy yoghurt, soy cheese, soy coffee whitener, soy coffee creamer and soy cream cheese. A simulated milk product may be combined with a milk product.

Snack: As used herein, the term "snack" includes, but is not limited to, for example, energy bar, nutrition bar, protein bar, crackers, doughnuts and chips. The term "snack" is also taken to include extruded snacks, for example, cheese balls, cheese curls, and rice pieces.

Soya fiber particulate: As used herein, the term "soya fiber particulate" includes, without limitation, a particle of ground soya. Suitable soya includes, but is not limited to, whole soybeans, full fat soy flour, full fat soy flakes, partially defatted soy flour, partially defatted soy flakes, defatted soy flour, defatted soy flakes, refatted soy flour, refatted soy flakes, soy protein concentrate and mixtures thereof. The ground soya may be suspended in water or a water-based product. The soya fiber particulate may include, for example, finely ground okara and cell wall debris. The soya fiber particulate may be concentrated into a powder form by evaporation or by dehydration. Alternatively, the soya fiber particulate may remain in a liquid form.

Spray drying: As used herein, the term "spray drying" includes transforming a fluid medium into a dry-powdered or particulate form. This is achieved by atomizing the fluid into a drying chamber, where the liquid droplets are passed through a hot-air stream. The objective is to produce a spray of high surface-to-mass ratio droplets, and to uniformly and quickly evaporate the water. Evaporation keeps product temperature to a minimum, so little high-temperature deterioration occurs.

The feed can be a solution, a suspension or a paste in the simplest form. The dried product can be powdered, granulated or agglomerated. The dry product form can be varied depending on the feed, dryer design and process conditions. Spray drying delivers a powder of specific particle size and moisture content regardless of the dryer capacity or product heat sensitivity. In a continuous operation, the spray-dryer delivers a highly controlled powder quality with relatively easy control.

Topping: As used herein, the term "toppings" includes, but is not limited to for example, salad dressing, whipped toppings, sauce, soy sauce and gravy.

Stability: As used herein, the term "stability" refers to the ability of the fiber particulate to resist sedimentation and/or stratification which occurs due to separation of the fiber particles from the main liquid suspension. Thus, a fiber particulate or a product comprising the fiber particulate that is characterized as "stable" is one in which the fiber particles remain suspended in the main liquid suspension for the shelf life of the product.

Various sources of soya fiber may be used to obtain the soya fiber particulate of the present invention. Suitable soya includes, but is not limited to, whole soybeans, full fat soy flour, full fat soy flakes, partially defatted soy flour, partially defatted soy flakes, defatted soy flour, defatted soy flakes, refatted soy flour, refatted soy flakes, soy protein concentrate and mixtures thereof.

The disclosed invention provides a soya fiber particulate having a particle size in a range of about 0.01 microns to about 100 microns, wherein at least about 50% to about 100% of the soya fiber particulate has a size in a range of about 0.01 microns to about 35 microns. Another embodiment of the invention provides a soya fiber particulate having a particle size in a range of about 0.01 microns to about 90 microns, wherein at least about 50% to about 100% of the soya fiber particulate has a size in a range of about 0.01 microns to about 35 microns. Another embodiment of the invention provides a soya fiber particulate having a particle size in a range of about 0.01 microns to about 85 microns, wherein at least about 50% to about 100% of the soya fiber particulate has a size in a range of about 0.01 microns to about 35 microns. Another embodiment of the invention provides a soya fiber particulate having a particle size in a range of about 0.01 microns to about 80 microns, wherein at least about 50% to about 100% of the soya fiber particulate has a size in a range of about 0.01 microns to about 35 microns. Another embodiment of the invention provides a soya fiber particulate having a particle size in a range of about 0.01 microns to about 75 microns, wherein at least about 50% to about 100% of the soya fiber particulate has a size in a range of about 0.01 microns to about 35 microns. Another embodiment of the invention provides a soya fiber particulate having a particle size in a range of about 0.01 microns to about 70 microns, wherein at least about 50% to about 100% of the soya fiber particulate has a size in a range of about 0.01 microns to about 35 microns. Another embodiment of the invention provides a soya fiber particulate having a particle size in a range of about 0.01 microns to about 65 microns, wherein at least about 50% to about 100% of the soya fiber particulate has a size in a range of about 0.01 microns to about 35 microns. Another embodiment of the invention provides a soya fiber particulate having a particle size in a range of about 0.01 microns to about 60 microns, wherein at least about 50% to about 100% of the soya fiber particulate has a size in a range of about 0.01 microns to about 35 microns. Another embodiment of the invention provides a soya fiber particulate having a particle size in a range of about 0.01 microns to about 55 microns, wherein at least 50% to about 100% of the soya fiber particulate has a size in a range of about 0.01 microns to about 35 microns. Another embodiment of the invention provides a soya fiber particulate having a particle size in a range of about 0.01 microns to about 50 microns, wherein at least about 50% to about 100% of the soya fiber particulate has a size in a range of about 0.01 microns to about 35 microns. Another embodiment of the invention provides a soya fiber particulate having a particle size in a range of about 0.01 microns to about 45 microns, wherein at least about 50% to about 100% of the soya fiber particulate has a size in a range of about 0.01 microns to about 35 microns. Another embodiment of the invention provides a soya fiber particulate having a particle size in a range of about 0.01 microns to about 40 microns, wherein at least about 50% to about 100% of the soya fiber particulate has a size in a range of about 0.01 microns to about 35 microns. Another embodiment of the invention provides a soya fiber particulate having a particle size in a range of about 0.01 microns to about 35 microns.

In one embodiment of the invention, there is provided a soya fiber particulate having a particle size in a range of about 0.01 microns to about 100 microns, wherein at least 50% to about 100% of the soya fiber particulate has a size in a range of about 0.01 microns to about 35 microns. Another embodiment of the invention provides a soya fiber particulate having a particle size in a range of about 0.01 microns to about 100 microns, wherein at least about 90% of the soya fiber particulate has a size in a range of about 0.01 microns to about 75 microns. Another embodiment of the invention provides a soya fiber particulate having a particle size in a range of about 0.01 microns to about 100 microns, wherein at least about 80% of said soya fiber particulate has a size in a range of about 0.01 microns to about 65 microns. Another embodiment of the invention provides a soya fiber particulate having a particle size in a range of about 0.01 microns to about 100 microns, wherein at least about 70% of the soya fiber particulate has a size in a range of about 0.01 microns to about 55 microns. Another embodiment of the invention provides a soya fiber particulate having a particle size in a range of about 0.01 microns to about 100 microns, wherein at least about 60% of the soya fiber particulate has a size in a range of about 0.01 microns to about 45 microns. Another embodiment of the invention provides a soya fiber particulate having a particle size in a range of about 0.01 microns to about 100 microns, wherein at least about 40% of the soya fiber particulate has a size in a range of about 0.01 microns to about 25 microns. Another embodiment of the invention provides a soya fiber particulate having a particle size in a range of about 0.01 microns to about 100 microns, wherein at least about 30% of the soya fiber particulate has a size in a range of about 0.01 microns to about 15 microns. Another embodiment of the invention provides a soya fiber particulate having a particle size in a range of about 0.01 microns to about 100 microns, wherein at least about 20% of the soya fiber particulate has a size in a range of about 0.01 microns to about 10 microns. Another embodiment of the invention provides a soya fiber particulate having a particle size in a range of about 0.01 microns to about 100 microns, wherein at least about 10% of the soya fiber particulate has a size in a range of about 0.01 microns to about 5 microns.

The disclosed invention also provides a soya fiber particulate having a particle size in a range of about 0.04 microns to about 100 microns, wherein at least 75% to about 90% of the soya fiber particulate has a size in a range of about 0.04 to about 35 microns. The disclosed invention also provides processes for preparing a soya fiber particulate. Furthermore, the invention conveniently enables the practitioner to prepare products comprising the soya fiber particulate of a very smooth texture and of a high nutritional quality.

In one embodiment of the invention, there is provided a soya fiber particulate having a particle size in a range of about 0.04 microns to about 100 microns, wherein at least 75% to about 90% of the soya fiber particulate has a size in a range of about 0.04 to about 35 microns. Another embodiment of the invention provides a soya fiber particulate having a particle size in a range of about 0.04 microns to about 90 microns, wherein at least 75% to about 90% of the soya fiber particulate has a size in a range of about 0.04 to about 35 microns. Another embodiment of the invention provides a soya fiber particulate having a particle size in a range of about 0.04 microns to about 85 microns, wherein at least 75% to about 90% of the soya fiber particulate has a size in a range of about 0.04 to about 35 microns. Another embodiment of the invention provides a soya fiber particulate having a particle size in a range of about 0.04 microns to about 80 microns, wherein at least 75% to about 90% of the soya fiber particulate has a size in a range of about 0.04 to about 35 microns. Another embodiment of the invention provides a soya fiber particulate having a particle size in a range of about 0.04 microns to about 75 microns, wherein at least 75% to about 90% of the soya fiber particulate has a size in a range of about 0.04 to about 35 microns. Another embodiment of the invention provides a soya fiber particulate having a particle size in a range of about 0.04 microns to about 70 microns, wherein at least 75% to about 90% of the soya fiber particulate has a size in a range of about 0.04 to about 35 microns. Another embodiment of the invention provides a soya fiber particulate having a particle size in range of about 0.04 microns to about 65 microns, wherein at least 75% to about 90% of the soya fiber particulate has a size in a range of about 0.04 to about 35 microns. Another embodiment of the invention provides a soya fiber particulate having a particle size in a range of about 0.04 microns to about 60 microns, wherein at least 75% to about 90% of the soya fiber particulate has a size in a range of about 0.04 to about 35 microns. Another embodiment of the invention provides a soya fiber particulate having a particle size in a range of about 0.04 microns to about 55 microns, wherein at least 75% to about 90% of the soya fiber particulate has a size in a range of about 0.04 to about 35 microns. Another embodiment of the invention provides a soya fiber particulate having a particle size in a range of about 0.04 microns to about 50 microns, wherein at least 75% to about 90% of the soya fiber particulate has a size in a range of about 0.04 to about 35 microns. Another embodiment of the invention provides a soya fiber particulate having a particle size in a range of about 0.04 microns to about 45 microns, wherein at least 75% to about 90% of the soya fiber particulate has a size in a range of about 0.04 to about 35 microns. Another embodiment of the invention provides a soya fiber particulate having a particle size in a range of about 0.04 microns to about 40 microns, wherein at least 75% to about 90% of the soya fiber particulate has a size in a range of about 0.04 to about 35 microns. Another embodiment of the invention provides a soya fiber particulate having a particle size in a range of about 0.04 microns to about 35 microns.

In another aspect of the invention, there is provided products comprising the soya fiber particulate which include but are not limited to beverages, dry mixes, milk products, tofu, miso, toppings, infant food, desserts, snacks, flour products, meat food products, simulated meat food products and pet food products.

In one embodiment of the invention, there is provided a process for preparing a soya fiber particulate. This process comprises grinding dehulled soya to yield a soya fiber particulate having a particle size in a range of about 0.01 microns to about 100 microns, wherein at least about 50% to about 100% of the soya fiber particulate has a size in a range of about 0.01 microns to about 35 microns, pasteurizing and/or sterilizing the soya fiber particulate, and homogenizing the soya fiber particulate to yield a soya fiber particulate. The pasteurizing and/or sterilizing the soy fiber particulate may be accomplished by heating the soya fiber particulate to a temperature in a range of about 50° C. to about 175° C. for at least 4 seconds. Also, the pasteurizing and/or sterilizing of the soy fiber particulate may be accomplished by heating the soya fiber particulate to a temperature in a range of about 65° C. to about 155° C. for at least 4 seconds. In one embodiment, the pasteurizing and/or sterilizing of the soya fiber particulate is accomplished prior to homogenizing the soya fiber particulate. In another embodiment, the homogenizing of the soya fiber particulate is accomplished prior to pasteurizing and/or sterilizing the soya fiber particulate.

In another embodiment, the grinding step useful to the process of the present invention yields soya fiber particulate of a median particle size in a range of about 10 microns to about 20 microns. At least about 40% of the soya fiber particulate yielded by the grinding step of the present invention may have a particle size in a range of about 0.01 microns to about 25 microns. Also, at least about 30% of the soya fiber particulate yielded by the grinding step of the present invention may have a particle size in a range of about 0.01 microns to about 15 microns. At least about 20% of the soya fiber particulate yielded by the grinding step of the present invention may have a particle size in a range of about 0.01 microns to about 10 microns. At least about 10% of the soya fiber particulate yielded by the grinding step of the present invention may have a particle size in a range of about 0.01 microns to about 5 microns.

In one embodiment, the grinding comprises wet grinding. In another embodiment, the grinding comprises dry grinding. In one embodiment, the grinding is performed by a bead mill. In another embodiment, the grinding is performed by a ball mill. In a further embodiment, the soya fiber is ground in an apparatus selected from, but in no way limited to, the group consisting of a vibratory mill, an agitator mill, an attrition mill, a roller ball mill, a planetary mill, a hammer mill, a toothed disc mill, a cone mill, a sand mill and a shearing wet mill with a rotor and stator arrangement.

In another embodiment of the invention, there is provided a process for preparing a soya fiber particulate. This process comprises grinding dehulled soybeans to yield a soya fiber particulate having a particle size in a range of about 0.04 microns to about 100 microns, wherein at least 75% to about 90% of the soya fiber particulate has a range of about 0.04 to about 35 microns; heating the soya fiber particulate to a temperature in a range of about 65° C. to about 155° C. for at least 4 seconds; cooling the processed soya fiber particulate to a temperature in a range of about 60° C. to about 100° C.; and homogenizing the cooled soya fiber particulate to yield a soya fiber particulate.

In one embodiment, the grinding step useful to the process of the present invention yields soya fiber particulate of a median particle size in a range of about 10 microns to about 20 microns. About 75% to about 90% of the soya fiber particulate yielded by the grinding step of the present invention may have a particle size in a range of about 0.04 microns to about 35 microns. Also, at least about 50% to about 75% of the soya fiber particulate yielded by the grinding step of the present invention may have a particle size in a range of about 0.04 microns to about 25 microns. At least about 25% to about 50% of the soya fiber particulate yielded by the grinding step of the present invention may have a particle size in a range of about 0.04 microns to about 15 microns. In another embodiment, at least about 10% to about 25% of the soya fiber particulate yielded by the grinding step of the present invention has a particle size in a range of about 0.04 microns to about 5 microns.

In one embodiment, the grinding step is performed by a bead mill. In another embodiment, the grinding step is performed by a ball mill. In a further embodiment, the soya fiber ground is an apparatus selected from, but in no way limited to, the group consisting of a vibratory mill, an agitator mill, an attrition mill, a roller ball mill, a planetary mill, a hammer mill, a toothed disc mill, a cone mill, a sand mill and a shearing wet mill with a rotor and stator arrangement.

In another aspect of the invention, there is provided a process for preparing a soya fiber particulate. This process comprises wet grinding dehulled soybeans to yield a soya fiber particulate having a particle size in a range of about 0.04 microns to about 100 microns, wherein at least 75% to about 90% of the soya fiber particulate has a size in a range of about 0.04 to about 35 microns; heating the soya fiber particulate to a temperature in a range of about 65° C. to about 155° C. for at least 4 seconds; cooling the processed soya fiber particulate to a temperature in a range of about 60° C. to about 100° C.; and homogenizing the cooled soya fiber particulate to yield a soya fiber particulate.

In one embodiment, the wet grinding step useful to the process of the present invention yields soya fiber particulate of a median particle size in a range of about 10 microns to about 20 microns. In another embodiment, at least about 75% to about 90% of the soya fiber particulate yielded by the wet grinding step of the present invention has a particle size in a range of about 0.04 microns to about 35 microns. In another embodiment, at least about 50% to about 75% of the soya fiber particulate yielded by the wet grinding step of the present invention has a particle size in a range of about 0.04 microns to about 25 microns. In yet a further embodiment, at least about 25% to about 50% of the soya fiber particulate yielded by the wet grinding step of the present invention has a particle size in a range of about 0.04 microns to about 15 microns. In an additional embodiment, at least about 10% to about 25% of the soya fiber particulate yielded by the wet grinding step of the present invention has a particle size in a range of about 0.04 microns to about 5 microns.

In an embodiment, the wet grinding step is performed by a bead mill. In another embodiment, the wet grinding step is performed by a ball mill. In a further embodiment, the soya fiber is ground in an apparatus selected from, but in no way limited to, the group consisting of a vibratory mill, an agitator mill, an attrition mill, a roller ball mill, a planetary mill, a hammer mill, a toothed disc mill, a cone mill, a sand mill and shearing wet mill with a rotor and stator arrangement.

In another embodiment of the invention, there is provided a process for preparing a soya fiber particulate. This process comprises dry grinding dehulled soybeans to yield a soya fiber particulate having a particle size in a range of about 100 microns to about 300 microns, wherein at least 75% to about 90% of the soya fiber particulate has a size in a range of about 100 to about 200 microns; heating the soya fiber particulate to a temperature in a range of about 65° C. to about 155° C. for at least 4 seconds; cooling the processed soya fiber particulate to a temperature in a range of about 60° C. to about 100° C.; and homogenizing the cooled soya fiber particulate to yield a soya fiber particulate.

In one embodiment, the dry grinding step useful to the process of the present invention yields soya fiber particulate of a median particle size in a range of about 10 microns to about 20 microns. In another embodiment, at least about 75% to about 90% of the soya fiber particulate has a particle size in a range of about 0.04 microns to about 35 microns. In an additional embodiment, at least about 50% to about 75% of the soya fiber particulate has a particle size in a range of about 0.04 microns to about 25 microns. In another embodiment, at least about 25% to about 50% of the soya fiber particulate has a particle size in a range of about 0.04 microns to about 15 microns. In a further embodiment, at least about 10% to about 25% of the soya fiber particulate has a particle size in a range of about 0.04 microns to about 5 microns.

In one embodiment, the dry grinding step is performed by a bead mill. In another embodiment, the dry grinding step is performed by a ball mill. In a further embodiment, the soya fiber is ground in an apparatus selected from, but in no way limited to, the group consisting of a vibratory mill, an agitator mill, an attrition mill, a roller ball mill, a planetary mill, a roller ball mill, a planetary mill, a hammer mill, a toothed disc mill, a cone mill, a sand mill and a shearing wet mill with a rotor and stator arrangement.

In one embodiment of the processes for preparing a soya fiber particulate, the soya fiber particulate is heated to a temperature in a range of about 65° C. to about 155° C. for at least 4 seconds. In another embodiment, the soya fiber particulate is heated to a temperature in a range of about 65° C. to about 155° C. for at least 6 seconds. In another embodiment, the soya fiber particulate is heated to a temperature in a range of about 65° C. to about 155° C. for at least 10 seconds. In another embodiment, the soya fiber particulate is heated to a temperature in a range of about 65° C. to about 155° C. for at least 15 seconds. In another embodiment, the soya fiber particulate is heated to a temperature in a range of about 65° C. to about 155° C. for at least 20 seconds. In another embodiment, the soya fiber particulate is heated to a temperature in a range of about 65° C. to about 155° C. for at least 30 seconds. In another embodiment, the soya fiber particulate is heated to a temperature in a range of about 65° C. to about 155° C. for at least 45 seconds. In another embodiment, the soya fiber particulate is heated to a temperature in a range of about 65° C. to about 155° C. for at least 60 seconds. In another embodiment, the soya fiber particulate is heated to a temperature in a range of about 65° C. to about 155° C. for at least 5 min. In another embodiment, the soya fiber particulate is heated to a temperature in a range of about 65° C. to about 155° C. for at least 10 min. In another embodiment, the soya fiber particulate is heated to a temperature in a range of about 65° C. to about 155° C. for at least 30 min. In another embodiment, the soya fiber particulate is heated to a temperature in a range of about 65° C. to about 155° C. for at least 1 hour. In another embodiment, the soya fiber particulate is heated to a temperature in a range of about 65° C. to about 155° C. for at least 3 hours.

The processes of preparing a soya fiber particulate according to the invention have the further advantage that they may be carried out continuously. In another embodiment, some of the steps in the processes of preparing a soya fiber particulate according to the invention may be carried out in batches.

In one embodiment of the invention, the soya fiber particulate is cooled and packaged. In another embodiment, the soya fiber particulate is dehydrated. In another embodiment, the soya fiber particulate is spray-dried.

The products comprising the soya fiber particulate of the present invention include, but are not limited to, fermented soy products, for example, tempheh, miso, soy sauces, natto and fermented tofu and other fermented soymilk products. Additional fermentation steps well known to one of ordinary skill in the art may be carried out in addition to the process of the present invention in order to obtain these fermented products. In another embodiment, the products comprising the soya fiber particulate of the present invention include nonfermented soy products, for example, whole soy flour, soymilk and soymilk products, tofu, okara and yuba.

Another advantage of the present invention is the high stability of the soya fiber particulate and products comprising the soya fiber particulate. The small particle size of the soya fiber particulate as well as the grinding in the process of the present invention are believed to enhance the stability of the soya fiber particulate. The grinding involved in the process of the present invention disrupts and opens up the fiber particles such that water or a water based liquid is allowed into the intracellular spaces. This leads to a higher viscosity in the soya fiber particulate, which, along with the small particle sizes of the fibers, provides a soya fiber particulate that is very stable. The soya fiber particulate and products comprising the soya fiber particulate may remain stable for at least 6 months. Also, the soya fiber particulate and products comprising the soya fiber particulate may remain stable for at least 7 months. Also, the soya fiber particulate and products comprising the soya fiber particulate may remain stable for at least 8 months. Also, the soya fiber particulate and products comprising the soya fiber particulate may remain stable for at least 9 months. Also, the soya fiber particulate and products comprising the soya fiber particulate may remain stable for at least 10 months. Also, the soya fiber particulate and products comprising the soya fiber particulate may remain stable for at least 11 months. Also, the soya fiber particulate and products comprising the soya fiber particulate may remain stable for at least 1 year.

In an embodiment, the soya fiber particulate and products comprising the soya fiber particulate have a sedimentation of less than about 5% by volume when centrifuged at a centrifugal force of at least 50 times the force due to the earth's gravity for 5 minutes. The soya fiber particulate and products comprising the soya fiber particulate may have a sedimentation of less than about 4% by volume when centrifuged at a centrifugal force of at least 50 times the force due to the earth's gravity for 5 minutes. Also, the soya fiber particulate and products comprising the soya fiber particulate may have a sedimentation of less than about 3% by volume when centrifuged at a centrifugal force of at least 50 times the force due to the earth's gravity for 5 minutes. Also, the soya fiber particulate and products comprising the soya fiber particulate may have a sedimentation of less than about 2% by volume when centrifuged at a centrifugal force of at least 50 times the force due to the earth's gravity for 5 minutes. Also, the soya fiber particulate and products comprising the soya fiber particulate may have a sedimentation of less than about 1% by volume when centrifuged at a centrifugal force of at least 50 times the force due to the earth's gravity for 5 minutes. Also, the soya fiber particulate and products comprising the soya fiber particulate may have a sedimentation of about 0% by volume when centrifuged at a centrifugal force of at least 50 times the force due to the earth's gravity for 5 minutes.

Other grains can also be used to obtain a fiber particulate similar to the soya fiber particulate in the present invention. Such grains include, but are not limited to, flax, sunflower, rice, canola, corn, wheat, rapeseed, and lupin. Other suitable sources of grain fiber include, but are not limited to, full fat grains, full fat grain flour, full fat grain flakes, partially defatted grain flour, partially defatted grain flakes, defatted grain flour, defatted grain flakes, refatted grain flour, refatted grain flakes, grain protein concentrate and mixtures thereof. The grains can be used in the method of the present invention to produce grain fiber particulates having the same advantages as the soya fiber particulate of the present invention. In one embodiment, the grain fiber particulate has a particle size in a range of about 0.01 microns to about 100 microns, wherein at least about 50% to about 100% of the grain fiber particulate has a size in a range of about 0.01 microns to about 35 microns. In another embodiment, the grain fiber particulate has a median particle size in a range of about 10 microns to about 20 microns.

In another aspect of the invention, there is provided products comprising the grain fiber particulate which include, but are not limited to, beverages, dry mixes, milk products, tofu, miso, toppings, infant food, desserts, snacks, flour products, meat food products, simulated meat food products and pet food products.

Another aspect of the invention also provides a process for preparing the grain fiber particulate, comprising grinding grain seeds to yield a grain fiber particulate having a particle size in a range of about 0.01 microns to about 100 microns, wherein at least about 50% to about 100% of the grain fiber particulate has a size in a range of about 0.01 to about 35 microns, pasteurizing and/or sterilizing the grain fiber particulate, and homogenizing the grain fiber particulate to yield a grain fiber particulate. The grain fiber particulate and products comprising the grain fiber particulate may remain stable for at least 6 months. Also, the grain fiber particulate and products comprising the grain fiber particulate may remain stable for at least 1 year. Also, the grain fiber particulate and products comprising the grain fiber particulate may have a sedimentation of less than about 5% by volume when centrifuged at a centrifugal force of at least 50 times the force due to the earth's gravity for 5 minutes. Also, the grain fiber particulate and products comprising the grain fiber particulate may have a sedimentation of about 0% by volume when centrifuged at a centrifugal force of at least 50 times the force due to the earth's gravity for 5 minutes.

The following examples are illustrative only and are not intended to limit the scope of the invention as defined by the appended claims. It will be apparent by those of ordinary skill in the art that various modifications and variations can be made in the methods of the present invention without departing from the spirit and scope of the invention. Thus, it is intended that the present invention covers the modifications and variations of this invention provided they come within the scope of the appended claims and their equivalents.

EXAMPLES

Example 1

Wet Milling Bean Cracks 3500 grams of organic white hylum soybeans were cleaned. The beans were cracked and dehulled yielding about 3250 grams of bean cracks. The bean cracks were added to 18,000 grams of 95° C. water. The slurry was run through a Boston Shearpump Model BSP 37-3. The resulting slurry was run through two times a Premier Supermill SM 15. at 5.0 gallons per hour with 1.2-1.7 Zirconox beads at a mill speed of 2700 feet per minute.

The product was jet cooked at 115° C. for 60 seconds, flash cooled under a pressure of 380 mm of mercury to a temperature of 82° C. The product was homogenized at 510 bar on the first stage and 34 bar on the second stage to a total of 544 bar of an APV Rannie 10.38 homogenizer. The product was spray dried on a tall form dryer with an air inlet temperature of 232° C. and an air outlet temperature of 82° C.

Results gave a soymilk product after standard dairy processing that was smooth and without off beany, grassy, or oxidized flavors. The product was smooth in the mouth without being astringent or gritty. The particle sizes of the soya fiber particulates were such that the mean particle size was about 22 microns and 90% of the particles were less than 44 microns.

Example 2

Dry Milling Bean Cracks

The beans are cracked and dehulled yielding about 3250 grams of bean cracks. The bean cracks are dry ground with a Bauermeister universal mill and the resulting powder is added to 18,000 grams of 95° C. The resulting slurry is run through two times a Premier Supermill SM 1.5 at 5.0 gallons per hour with 1.2-1.7 Zirconox beads at a mill speed of 2700 feet per minute.

The product was jet cooked at 115° C. for 60 seconds, flash cooled under a pressure of 380 mm of mercury to a temperature of 82° C. The product was homogenized at 510 bar on the first stage and 34 bar on the second stage to a total of 544 bar of an APV Rannie 10.38 homogenizer. The product was sprayed dried on a tall form dryer with an air inlet temperature of 232° C. and an air outlet temperature of 82° C.

Results gave a soymilk product after standard dairy processing that was smooth and without off beany, grassy, or oxidized flavors. The product was smooth in the mouth without being astringent or gritty. The particle sizes of the soya fiber particulates were such that the mean particle size was about 24 microns and 90% of the particles were less than 45 microns.

Example 3

Soya Fiber Particulate Particle Sizes

Soymilk was made with the soya fiber particulate produced in Example 1. The size of particles in the soymilk was determined, as shown in Table 1.

TABLE 1

| Soymilk particle size | |
| --- | --- |
| % Soya Fiber Participate | Particle Diameter (microns) |
| 10 | 3.4 |
| 25 | 8.3 |
| 50 | 17.6 |
| 75 | 31.3 |
| 90 | 46.4 |
| 95 | 57 |
| 100 | 105 |

Example 4

Whole Bean Soymilk Stability and Soy Fiber Particulate Stability

The stability of the soymilk was demonstrated by centrifuging two soymilks. The first soymilk is produced as in Example 1, and reconstituted, ultra high temperature pasteurized at 140° C. for 4 seconds, homogenized at 170 bar and cooled to 4° C. The second soymilk was a commercial product of similar composition, but produced by dry grinding and had a particle size range between 0.5 microns to 350 microns. It was also reconstituted and processed as the first soymilk before testing for stability.

The stability test was made using an IEC Centra GP8 centrifuge. Samples were measured into 50-milliliter centrifuge tubes. The samples were placed in the centrifuge and centrifuged at 500 rpm for 5 minutes. The results show that the product produced by Example 1 (the first soymilk) does not show a significant amount of sedimentation whereas the commercial product produced by dry grinding (the second soymilk) showed 5% by volume sedimentation. The products were examined under a light microscope. The product produced by Example 1 showed particles that were smaller and had voids, while the dry ground commercial product showed larger particles that were more crystalline in structure.

Example 5

Defatted Soy Flakes Soymilk Stability and Soy Fiber Particulate Stability

The stability of the soymilk was demonstrated by centrifuging a soymilk made with defatted soy flakes using the process described in Example 1. Defatted soy flakes (NU-TRISOY 7B Flakes, commercially available from Archer Daniels Midland Company of Decatur, Ill.) are processed in the same manner as the bean cracks according to Example 1. 15,000 grams of defatted soy flakes were mixed with 85,000 grams of 95° C. water to produce a slurry. The resulting slurry was run through two times a Premier Supermill SM 15. at 5.0 gallons per hour with 1.2-1.7 Zirconox beads at a mill speed of 2700 feet per minute. The product was jet cooked at 115° C. for 60 seconds, flash cooled under a pressure of 380 mm of mercury to a temperature of 82° C. The product was homogenized at 510 bar on the first stage and 34 bar on the second stage to a total of 544 bar of an APV Rannie 10.38 homogenizer. The product was spray dried on a tall form dryer with an air inlet temperature of 232° C. and an air outlet temperature of 82° C. To produce the soymilk product, the dried product was reconstituted, ultra high temperature pasteurized at 140° C. for 4 seconds, homogenized at 170 bar and cooled to 4° C.

Stability of the soymilk product was measured using an IEC Centra GP8 centrifuge. Samples were deposited into 50-milliliter centrifuge tubes. The samples were placed in the centrifuge and centrifuged at 500 rpm for 5 minutes. The results show that the product produced by this method with defatted soy flakes does not show a significant amount of sedimentation. The product was examined under a light microscope. The product produced with defatted soy flakes by Example 1 showed particles that were small and had voids.

Example 6

Flax Fiber Particulate

Other grains were also run using the procedure of Example 1. 30 pounds whole flax seed was added to 300 pounds of 95° C. water. The product was run through a shear pump which had three grinding heads. A shear pump is a rotor and stator type system which reduces the particle size to approximately 150-200 microns. The product is run through the bead mill, homogenized, pasteurized and spray dried. Upon reconstitution, the particles' size ranged between 0.04 microns and 95 microns with 80% of the particles being between 0.04 microns and 35 microns.

Example 7

Whole Soybean Powder

A whole soybean powder was produced using the process of the flowchart of FIG. 1. Whole soybeans were tempered at 60° C. The tempered soybeans were cracked with cracking rolls and subjected to aspiration to remove the hulls and produced cracks. The cracks were passed over cracking rolls again, and placed into 95° C. water, thus forming a slurry. The slurry was conveyed with a slurry conveyer through a shear pump and subjected to bead milling. The milled product was shear (jet) cooked at between 100-140° C., flashed cooled at 80° C., and homogenized at between 2000-8000 PSI. The homogenized product was run through a high pressure pump and spray dried.

The whole soybean powder produced with this Example has the following composition: about 40-43% protein (may range from 40-45%), as determined by measuring nitrogen (N) times 6.25; about 19-24% fat; about 16-19% total dietary fiber, a minimum of 95% insoluble; about 6% maximum moisture; about 2 mg/g of isoflavones; about 27% total carbohydrates; about 6% ash, and an off-white to creamy color. The whole soybean powder also has the following amino acid contribution, as a percent of the total protein: about 4.6% isoleucine; about 7.6% leucine; about 6.3% lysine; about 1.3% methionine; about 5.0% phenylalanine; about 3.8% tyrosine; about 4.2% threonine; about 1.2% tryptophan; about 5.2% valine; and about 1.6% cysteine.

The whole soybean powder produced with this example also has the following nutritional facts for a 25 gram serving: about 110 calories (may range from 90-120); about 45 calories from fat; total fat of about 5 grams; about 1 gram of saturated fat; 0 grams of trans fat; 3 grams of polyunsaturated fat; 0 grams of cholesterol; 0 grams of sodium; about 7 grams of total carbohydrates; about 3 grams of sugar; about 4 grams of dietary fiber; about 10 grams of protein; about 6% of vitamin E based on a 2000 calorie diet; about 4% of calcium based on a 2000 calorie diet; and about 12% of iron based on a 2000 calorie diet. One hundred grams of the whole soybean powder has the following nutritional values for minerals: 1600-2000 mg potassium; 150-300 mg of calcium; 500-700 mg of phosphorus; 100-300 mg of magnesium; 2-4 mg of zinc; 7-10 mg of iron; 2-4 mg of manganese; and 1-2 mg of copper. One hundred grams of the whole soybean powder has the following nutritional values for vitamins: about 0.65 mg of thiamin B1; about 0.30 mg of riboflavin B2; about 5 mg of niacin; about 2.5 mg of pantothenic acid; and about 0.25 mg of folic acid.

While certain data has been presented with regards to the whole soybean powders in this Example, it will be apparent by one of ordinary skill in the art that such data is exemplary and that the data may vary depending on various conditions including, but not limited to, variations in soybeans produced from year to year, variations in soybean varieties and variations in processing conditions.

Example 8

A whole soybean powder produced using the processes of the present invention is used to create a soymilk at 9% solids. The soymilk is pasteurized at 72° C. for 30 minutes, homogenized at 2000 psig and cooled to 4° C. The soymilk is allowed to set overnight at 4° C.

A flavor panel analysis is performed by a panel of subjects having experience in evaluating soymilk and is used to test the soymilk produced according to the processes of the present invention. The soymilk is rich and has a creamy body, with a slightly toasted and slight, green flavor.

A dry ground soybean powder is produced and is used to create a soymilk at 9% solids. The dry ground soybean powder may be produced as described in U.S. Pat. No. 6,244,528. The soymilk is pasteurized at 72° C. for 30 minutes, homogenized at 2000 psig and cooled to 4° C. The soymilk is allowed to set overnight at 4° C.

A flavor panel analysis is performed by a panel of subjects having experience in evaluating soymilk and is used to test the soymilk having the dry ground soybean powder. The soymilk is thin in body, with a very green, grassy flavor.

The soymilk produced with the wet grinding process of the present invention is preferred by the subjects of the panel as compared to the soymilk produced with the dry ground soybean flavor since the wet grinding process results in a soymilk with a better flavor, i.e., it is less green and/or less beany, as compared to the soymilk produced with the dry grinding process.

All patents and publications referred to herein are expressly incorporated by reference in their entirety.

What is claimed is:

1. A composition consisting of:
   particles of dehulled whole soybeans, including okara;
   wherein at least 90% of the particles have a size of less than 45 microns;
   wherein the composition in powder form is 40-45% protein, 19-24% fat, and 16-19% total dietary fiber;
   wherein upon production of a soymilk with the composition and evaluation of the soymilk by flavor panel analysis, the soymilk has a better flavor as compared to a soymilk produced with a dry ground soybean powder.

2. The composition of claim 1, wherein upon production of a soymilk with the composition and evaluation of the soymilk by flavor panel analysis, the soymilk has a less green flavor as compared to a soymilk produced with a dry ground soybean powder.

3. The composition of claim 1, wherein 25 grams of the particles comprise 7-10 milligrams of iron.

4. A soymilk, comprising:

5-10% solids consisting of particles of wet ground, dehulled whole soybeans, including okara;
   wherein at least 90% of the particles have a size of less than 45 microns;
   wherein the particles are 40-45% protein, 19-24% fat, and 16-19% total dietary fiber; and
a compound selected from the group consisting of a sweetener, a color, a flavor, a fruit, a cocoa product, a vitamin, a stabilizer, an emulsifier and combinations thereof;
wherein upon evaluation of the soymilk by flavor panel analysis, the soymilk has a better flavor as compared to a soymilk produced with a dry ground soybean powder.

5. The soymilk of claim 4, wherein the soymilk has a less green flavor as compared to a soymilk produced with a dry ground soybean powder.

6. The soymilk of claim 4, wherein the soymilk has a less beany flavor as compared to a soymilk produced with a dry ground soybean powder.

* * * * *